(12) United States Patent
Maziuk, Jr.

(10) Patent No.: US 7,854,911 B2
(45) Date of Patent: Dec. 21, 2010

(54) METHOD OF REMOVING SULFUR DIOXIDE FROM A FLUE GAS STREAM

(75) Inventor: John Maziuk, Jr., Kingwood, TX (US)

(73) Assignee: Solvay Chemicals, Inc., Houston, TX (US)

( * ) Notice: Subject to any disclaimer, the term of this patent is extended or adjusted under 35 U.S.C. 154(b) by 0 days.

(21) Appl. No.: 12/413,057

(22) Filed: Mar. 27, 2009

(65) Prior Publication Data

US 2009/0241774 A1  Oct. 1, 2009

Related U.S. Application Data

(63) Continuation of application No. 11/208,432, filed on Aug. 18, 2005, now Pat. No. 7,531,154.

(51) Int. Cl.
B01D 53/50 (2006.01)

(52) U.S. Cl. ............... 423/243.01; 423/243.08; 423/244.01; 423/244.07; 423/244.08

(58) Field of Classification Search ............ 423/243.01, 423/243.08, 244.01, 244.07, 244.08
See application file for complete search history.

(56) References Cited

U.S. PATENT DOCUMENTS

| | | | |
|---|---|---|---|
| 3,524,720 A | 8/1970 | Bauer |
| 3,704,569 A | 12/1972 | Hardison et al. |
| 3,709,977 A | 1/1973 | Villiers-Fisher |
| 3,722,178 A | 3/1973 | Aaland et al. |
| 3,833,711 A | 9/1974 | Villiers-Fisher |
| 3,846,535 A | 11/1974 | Fonseca |
| 3,868,444 A | 2/1975 | Frevel et al. |
| 3,869,538 A | 3/1975 | Sproul et al. |
| 3,880,629 A | 4/1975 | Dulin et al. |
| 3,932,587 A | 1/1976 | Grantham et al. |
| 3,932,588 A | 1/1976 | Libutti et al. |
| 3,966,878 A | 6/1976 | Pausch et al. |
| 3,984,296 A | 10/1976 | Richards |

(Continued)

FOREIGN PATENT DOCUMENTS

EP  0 170 355 A2  2/1986

(Continued)

OTHER PUBLICATIONS

"Integrated Dry NOx/SO2 Emissions Control System A DOE Assessment" published by the U. S. Dept. of Energy, Oct. 2001, DOE/NETL-2002/1160, pp. 1-47.*

(Continued)

Primary Examiner—Timothy C Vanoy
(74) Attorney, Agent, or Firm—Brinks Hofer Gilson & Lione

(57) ABSTRACT

A method of removing $SO_x$ from a flue gas stream including $SO_x$ includes providing a source of trona and injecting the trona as a dry sorbent into the flue gas stream. The temperature of the flue gas is at an elevated temperature greater than 400° F., preferably between about 600° F. and about 900° F. The trona is maintained in contact with the flue gas for a time sufficient to react a portion of the trona with a portion of the $SO_x$ to reduce the concentration of the $SO_2$ and/or $SO_3$ in the flue gas stream.

13 Claims, 5 Drawing Sheets

U.S. PATENT DOCUMENTS

| | | | |
|---|---|---|---|
| 4,001,384 A | 1/1977 | Iwakura et al. | |
| 4,021,526 A | 5/1977 | Gancy et al. | |
| 4,034,063 A * | 7/1977 | Rosar et al. | 75/429 |
| 4,105,744 A | 8/1978 | Erdoess et al. | |
| 4,113,447 A | 9/1978 | Bennett et al. | |
| 4,185,080 A | 1/1980 | Rechmeier | |
| 4,197,278 A | 4/1980 | Gehri et al. | |
| 4,198,380 A | 4/1980 | Kohl | |
| 4,208,192 A | 6/1980 | Quigley et al. | |
| 4,208,386 A | 6/1980 | Arand et al. | |
| 4,220,478 A | 9/1980 | Schuff | |
| 4,244,930 A | 1/1981 | Weber | |
| 4,273,750 A | 6/1981 | Hollett, Jr. et al. | |
| 4,306,885 A | 12/1981 | Kober et al. | |
| 4,325,924 A | 4/1982 | Arand et al. | |
| 4,352,747 A | 10/1982 | Every et al. | |
| 4,385,039 A | 5/1983 | Lowell et al. | |
| 4,391,207 A | 7/1983 | Petersen | |
| 4,439,351 A | 3/1984 | Sinha | |
| 4,481,172 A | 11/1984 | Lowell et al. | |
| 4,504,451 A | 3/1985 | Quee et al. | |
| 4,533,364 A | 8/1985 | Altman et al. | |
| 4,540,554 A | 9/1985 | Dayen | |
| 4,547,351 A | 10/1985 | Im et al. | |
| 4,555,391 A | 11/1985 | Cyran et al. | |
| 4,559,211 A | 12/1985 | Feldman et al. | |
| 4,588,569 A | 5/1986 | Cyran et al. | |
| 4,609,539 A | 9/1986 | Horecky et al. | |
| 4,620,856 A | 11/1986 | Rosenberg et al. | |
| 4,629,545 A | 12/1986 | Mani et al. | |
| 4,645,652 A | 2/1987 | Kimura | |
| 4,663,136 A | 5/1987 | Furlong | |
| 4,664,893 A | 5/1987 | Sarapata et al. | |
| 4,726,710 A | 2/1988 | Rosar et al. | |
| 4,731,233 A | 3/1988 | Thompson et al. | |
| 4,738,690 A | 4/1988 | Radway et al. | |
| 4,743,439 A | 5/1988 | Ready | |
| 4,780,290 A | 10/1988 | Curtius | |
| 4,783,325 A | 11/1988 | Jones | |
| 4,795,586 A | 1/1989 | Thompson et al. | |
| 4,795,619 A | 1/1989 | Lerner | |
| 4,810,478 A | 3/1989 | Graf | |
| 4,839,147 A | 6/1989 | Lindbauer et al. | |
| 4,844,915 A | 7/1989 | Hooper | |
| 4,853,194 A | 8/1989 | Hino et al. | |
| 4,859,438 A | 8/1989 | Lindbauer et al. | |
| 4,871,522 A | 10/1989 | Doyle | |
| 4,872,887 A | 10/1989 | Altman et al. | |
| 4,917,875 A | 4/1990 | Moore et al. | |
| 4,921,886 A | 5/1990 | Ewan et al. | |
| 4,940,569 A | 7/1990 | Neal et al. | |
| 4,946,311 A | 8/1990 | Rosar et al. | |
| 4,954,324 A | 9/1990 | Hooper et al. | |
| 4,960,445 A | 10/1990 | Helfritch et al. | |
| 4,960,577 A | 10/1990 | Torbov et al. | |
| 4,966,610 A | 10/1990 | Krigmont et al. | |
| 4,973,459 A | 11/1990 | Lippert et al. | |
| 4,975,257 A | 12/1990 | Lin | |
| 4,987,839 A | 1/1991 | Krigmont et al. | |
| 5,002,741 A | 3/1991 | Hooper et al. | |
| 5,034,114 A | 7/1991 | Kukin | |
| 5,074,226 A | 12/1991 | Lynch | |
| 5,082,586 A | 1/1992 | Hooper | |
| 5,118,480 A | 6/1992 | Cook et al. | |
| 5,120,508 A | 6/1992 | Jones | |
| 5,165,902 A | 11/1992 | Bortz et al. | |
| 5,165,903 A | 11/1992 | Hunt et al. | |
| 5,219,536 A | 6/1993 | Pinnavaia et al. | |
| 5,284,637 A | 2/1994 | Merritt et al. | |
| 5,346,674 A | 9/1994 | Weinwurm et al. | |
| 5,470,556 A | 11/1995 | Samish | |
| 5,540,902 A | 7/1996 | De Soete | |
| 5,582,807 A | 12/1996 | Liao et al. | |
| 5,585,081 A | 12/1996 | Chu et al. | |
| 5,591,249 A | 1/1997 | Hankins | |
| 5,591,412 A | 1/1997 | Jones et al. | |
| 5,591,417 A | 1/1997 | Buchanan et al. | |
| 5,599,508 A | 2/1997 | Martinelli | |
| 5,658,547 A | 8/1997 | Michalak et al. | |
| 5,678,493 A | 10/1997 | Kelley et al. | |
| 5,872,887 A | 2/1999 | Walker et al. | |
| 5,879,433 A | 3/1999 | Gallup et al. | |
| 5,935,539 A | 8/1999 | Depelsenaire | |
| 5,938,818 A | 8/1999 | Miller | |
| 5,961,837 A | 10/1999 | Ferrara et al. | |
| 6,001,152 A | 12/1999 | Sinha | |
| 6,033,639 A | 3/2000 | Odenmo | |
| 6,117,405 A | 9/2000 | Frey et al. | |
| 6,126,910 A | 10/2000 | Wilhelm et al. | |
| 6,143,263 A | 11/2000 | Johnson et al. | |
| 6,168,709 B1 | 1/2001 | Etter | |
| 6,180,074 B1 | 1/2001 | Fourcot et al. | |
| 6,214,308 B1 | 4/2001 | Keener et al. | |
| 6,267,802 B1 | 7/2001 | Baldrey et al. | |
| 6,270,555 B1 | 8/2001 | Wood et al. | |
| 6,290,872 B1 | 9/2001 | Fourcot et al. | |
| 6,303,083 B1 | 10/2001 | Johnson et al. | |
| 6,352,653 B1 | 3/2002 | Hirano et al. | |
| 6,490,984 B1 | 12/2002 | Moriya et al. | |
| 6,522,994 B1 | 2/2003 | Lang | |
| 6,722,295 B2 | 4/2004 | Zauderer | |
| 6,780,385 B2 | 8/2004 | Sakurai et al. | |
| 6,797,035 B2 | 9/2004 | Baldrey et al. | |
| 6,803,025 B2 | 10/2004 | Meserole et al. | |
| 7,022,296 B1 | 4/2006 | Khang et al. | |
| 7,481,987 B2 * | 1/2009 | Maziuk, Jr. | 423/215.5 |
| 7,531,154 B2 * | 5/2009 | Maziuk, Jr. | 423/243.01 |
| 2002/0001556 A1 | 1/2002 | Sakurai et al. | |
| 2002/0054846 A1 | 5/2002 | Fagiolini et al. | |
| 2002/0061271 A1 | 5/2002 | Zauderer | |
| 2004/0040438 A1 | 3/2004 | Baldrey et al. | |
| 2005/0201914 A1 | 9/2005 | Ritzenthaler | |
| 2005/0255605 A1 | 11/2005 | Muzio et al. | |
| 2005/0260114 A1 | 11/2005 | Higgins et al. | |
| 2006/0034743 A1 | 2/2006 | Radway et al. | |
| 2007/0081936 A1 | 4/2007 | Maziuk | |
| 2007/0243121 A1 | 10/2007 | Rogan | |

FOREIGN PATENT DOCUMENTS

| | | |
|---|---|---|
| EP | 0 309 848 A2 | 4/1989 |
| EP | 1004345 A2 | 5/2000 |
| GB | 2106489 A | 4/1983 |
| JP | 63 175652 A | 7/1998 |
| WO | WO 93/14026 A | 7/1993 |
| WO | WO 02/08666 A1 | 1/2002 |
| WO | WO 2007/031552 A1 | 3/2007 |

OTHER PUBLICATIONS

"Successful Mitigation of SO3 Emissions While Simultaneously Enhancing ESP Operation at the General James M. Gavin Plant in Cheshire, Ohio by Employing Dry Sorbent Injection of Trona Upstream of the ESP" by Douglas P. Ritzenthaler et al., Aug. 31, 2004, Paper No. 8, Mega Symposium 2004, pp. 1-15.*

"Bench-Scale Study of the Dry Removal of SO2 With Nahcolite and Trona" prepared by KVP, Inc., CS-1744 Research Project 982-8, Mar. 1981, pp. S-2, S-3, S-8, S-9 and S-10.*

Solvay Chemicals Technical Publication "Trona Use in Dry Sodium Injection for Acid Gas Removal" copyrighted 2005, pp. 1-8 to 8-8.*

"Trona Use in Dry Sodium Injection for Acid Gas Removal"; Solvay Chemicals Technical Publication; Solvay Chemicals, Inc. 2005.

"Clean Coal Technology"; Technologies for the Combined Control of Sulfur Dioxide and Nitrogen Oxides Emissions from Coal-Fired Boilers; a report on three projects conducted under separate cooperative agreements between: U.S. Department of Energy and—ABB Environmental Systems,—The Babcock & Wilcox Company,—Public Service Company of Colorado; 25pp; May 1999.

Andrea B. Baldwin; "Trona Use in Dry Sodium Injection for Acid Gas Removal"; Solvay Minerals, Inc.; Houston, TX (date unknown).

DOE/NETL-2002/1160 "Integrated Dry NOx/SO2 Emissions Control System A DOE Assessment", U.S. Department of Energy and National Energy Technology Laboratory; 47 pp; Oct. 2001.

Douglas P. Ritzenthaler et al.; "Successful Mitigation of $SO_3$ Emissions While Simultaneously Enhancing ESP Operation at the General James M. Gavin Plant in Cheshire, Ohio by Employing Dry Sorbent Injection of Trona Upstream of the ESP"; Mega Symposium 2004; Aug. 31, 2004.

Edwin Haddad et al. Full-Scale Evaluation of a Multi-Pollutant Reduction Technology: $SO_2$, Hg, and NOx Mobotec USA, Inc. Paper # 117; 10 pp; Paper presented at the 2003 Mega Symposium.

Glass Manufacturing; World Bank Group; Pollution Prevention and Abatement Handbook; Jul. 1998.

J.R. Peterson et al.; "$SO_3$ Removal From Flue Gas by Sorbent Injection EPRI HSTC Phase II Test Results"; US Environmental Protection Agency; vol. 23, Paper No. 6g (1995); Palo Alto, CA.

Jack R. McDonald et al.; "Results from Sodium Conditioning Tests with Low SCA, Cold-Side Electrostatic Precipitators with Various Coals"; Indianapolis Power & Light Company; Indianapolis, Indiana (date unknown).

James H. Turner et al.; "Electrostatic Precipitators"; Innovative Strategies and Economics Group, OAQPS; U.S. Environmental Protection Agency; Research Triangle Park; NC; Dec. 1995.

John Maziuk; "Successful Mitigation of $SO_3$, By Employing Dry Sorbent Injection of Trona Upstream of the ESP"; Mega Symposium 2005; Sep. 18, 2005.

L.J. Muzio et al.; "22 MW Coal-Fired Demonstration of Dry $SO^2$ Scrubbing with Sodium Sorbent Compounds"; Second EPRI Conference on Fabric Filter Technology for Coal-Fired Power Plants; Denver, Colorado; Mar. 22-24, 1983.

L.J. Muzio et al.; "Bench-Scale Study of the Dry Removal of $SO_2$ With Nahcolite and Trona"; Electric Power Research Institute; KVB, Inc.; EPRI CS-1744, Project 982-9, Final Report Mar. 1981; Irvine, CA.

R.K. Srivastava et al.; "Emissions of Sulfur Trioxide from Coal-Fired Power Plants"; Presented at Power-Gen International 2002, Dec. 10-12, 2002; Orlando, Florida.

Rangesh Srinivasan; "Study of Trona (Sodium Sesquicarbonate) Reactivity with Sulfur Dioxide in a Simulated Flue Gas"; University of Cincinnati; Mar. 2, 2004.

Richard T. Wilburn et al.; "SCR Ammonia Slip Distribution in Coal Plant Effluents and Dependence upon $SO_3$"; PowerPlant Chemistry 2004, 6(5).

Solvay Minerals; "T-200 Natural Sodium Sesquicarbonate for Dry Sorbent Injection—Naturally, the one to use"; Houston, TX. (date unknown).

Solvay; "Technologies for the Environment—Neutreck—Flue gas cleaning and recycling of residues"; BR 1610; Jul. 2002.

"Broyage de Bicarbonate de Sodium"; Dec. 2003.

"Chemical Engineer's Handbook," Fifth Edition (1973) pp. 20-30-20-45, and 21-39-21-45.

"Combined Power Plant Air Pollutant Control Mega Symposium", Washington, DC; Aug. 30-Sep. 2, 2004.

"International Search Report" in related International Application No. PCT/2006/066358, dated Nov. 29, 2006.

"International Search Report" in related International Application No. PCT/2006/066359, dated Dec. 13, 2006.

"Mesh to Micron Conversion Chart", Fluid Engineering; http://www.fluideng.com/FE/meshmicron.html; 1 pg; Feb. 27, 2008.

"$SO_2$ Control System Dry Injection of Trona T-200 Description and Operation"; Golden Valley Electric Association, Inc., Healy Power Plant, Unit No. 1; Goodrich Management & Construction Services, LLC; circa May 2005.

"Steam 40, Performance Calculations," Babcock & Wilcox, pp. 21-16, to 21-17, Copyright 1992.

AEP: Environmental: Environmental news releases: Corporate Citizenship—"AEP to Begin Construction of Emission Control System at AMOS, Mountaineer Plants as Part of Environmental Compliance Program"; http://www.aep.com/environmental/news; 3 pg; Feb. 13, 2008.

Application of Trona at Cemex's Odessa, Texas Cement Plant for SO2 Control; Solvay Chemicals Technical Publication (2004); Solvay Chemicals, Inc., Houston, Texas, USA.

Blythe, G.M., "Furnace Injection of Alkaline Sorbents for Sulfuric Acid Removal," URS Corporation, 91 pages, Jan. 2004.

Brussels Search Report, "Rapport De Recherche Documentaire"; 8 pp; 2005.

Cardinal Search Report "Method of Removing $SO_3$ from a Flue Gas Stream 12493.17", 5 pg; Mar. 7, 2008.

Cardinal Search Report Extended View "Method of Removing $SO_3$ from a Flue Gas Stream 12493.17", 17 pp; Mar. 7, 2008.

Flint Goodrich, et al.; Injection of Sodium Sesquicarbonate (Trona T-200) for $SO_2$ Emission Control at Golden Valley Electric Association, Healy Power Plant Unit No. 1; Aug. 6-8, 2003.

J.P. Gooch, et al.; "Improvement of Hot-side Precipitator Performance with Sodium Conditioning—An Interim Report"; Control Technology News; Mar. 1981.

Joseph R. Peterson, et al.; "Pilot-Scale Evaluation of Sorbent Injection to Remove $SO_3$ and HC1"; 1990 SO2 Control Symposium vol. 3: Sessions 6B,6C,7A,7B and Poster; Sponsored by Electric Power Research Institute and U.S. Environmental Protection Agency; May 8-11, 1990.

Katz, P.E., Jacob, "The Art of Electrostatic Precipitation," Precipitator Technology, Inc., pp. 62-63 and pp. 282-283, Copyright 1979.

Liu et al., Environmental Engineer's Handbook (Secions 5.4 and 5.17) $2^{nd}$ Ed. (1997).

Nelson, Wharton, "A Study of the Fouling Mechanism of Kraft Chemical Recovery Boiler Economizer and Convection Steam Generating Tubes," TAPPI Proceedings, 1985 Pulping Conference, pp. 497-504.

Office Action from U.S. Appl. No. 11/229,011; Inventor: Maziuk, Jr. Mail Date Jun. 19, 2007.

Office Action from U.S. Appl. No. 11/229,011; Inventor: Maziuk, Jr. Mail Date Sep. 24, 2007.

Office Action from U.S. Appl. No. 11/229,011; Inventor: Maziuk, Jr. Mail Date Nov. 1, 2007.

Office Action from U.S. Appl. No. 11/229,011; Inventor: Maziuk, Jr. Mail Date Apr. 22, 2008.

Office Action from U.S. Appl. No. 11/229,056; Inventor Maziuk Jr.; Mail Date Jul. 20, 2006.

Office Action, mailed Nov. 1, 2007, in U.S. Appl. No. 11/073,887.

Patent Interference No. 105,693, First Declaration of Larry J. Muzio, Ph.D., Ritzenthaler v. Maziuk, Oct. 9, 2009.

Patent Interference No. 105,693, First Declaration of Soon-Jai Khang, Ritzenthaler v. Maziuk, Jul. 14, 2009.

Patent Interference No. 105,693, Maziuk's List of Exhibits, Ritzenthaler v. Maziuk, Jan. 5, 2010.

Patent Interference No. 105,693, Revised Maziuk's and Ritzenthaler's Responses to Motion 7 Material Facts, Nov. 20, 2009.

Patent Interference No. 105,693, Revised Maziuk's Motion 7, Jul. 14, 2009.

Patent Interference No. 105,693, Revised Maziuk's Reply 7, Nov. 6, 2009.

Patent Interference No. 105,693, Revised Ritzenthaler Opposition to Maziuk Motion 7, Nov. 30, 2009.

Patent Interference No. 105,693, Ritzenthaler's Updated List of Exhibits, Ritzenthaler v. Maziuk, Nov. 6, 2009.

Patent Interference No. 105,693, Second Declaration of Soon-Jai Khang, Ritzenthaler v. Maziuk, Oct. 9, 2009.

Patent Interference No. 105,693, Supplemental Declaration of Lawrence J. Muzio, Ph.D., Ritzenthaler v. Maziuk, Oct. 28, 2009.

Patent Interference No. 105,693, Supplemental Declaration of Soon-Jai Khang, Ritzenthaler v. Maziuk, Jul. 23, 2009.

Poon, W.; Barham D.; and Tran, H., "Formation of Acidic Sulfates in Kraft Recovery Boilers," TAPPI Journal, vol. 76(7), p. 1987 (Jul. 1993).

Ritzenthaler, Maziuk; "Successful SO$_3$ Mitigation While Enhancing ESP Operation at AEP's Gavin Plant by Dry Injection of Trona"; Solvay Chemicals, Inc.; 30 pp; Dec. 1, 2004.

Singer, Joseph G., "Combustion Fossil Power Systems, A Reference book on Fuel Burning and Steam Generation," Published by Combustion Engineering, Inc., pp. 17-7 to 17-19, Copyright 1981.

Sturtevant, Inc.; "Pin Mills" brochure; 2004.

Tim C. Keener Ph.D.; "Sponsored Research Agreement" between Solvay Minerals, Inc. and the University of Cincinnati; Exhibit A: "Study of Trona (Sodium Sesquicarbonate) Reactivity with Sulfur Dioxide in a Simulated Flue Gas"; Feb. 23, 2001.

Turner et al., "Energy Management Handbook" (Section 8.4.5) (2004).

Zevenhoven & Kilpinen; "Chapter 5 Particulates"; Particulates; 31 pp; Dec. 6, 2001.

* cited by examiner

METHOD OF REMOVING SULFUR DIOXIDE FROM A FLUE GAS STREAM

RELATED APPLICATIONS

This application is a continuation application of U.S. application Ser. No. 11/208,432, filed on Aug. 18, 2005, now U.S. Pat. No. 7,531,154 B2 (the entire content of which is hereby incorporated by reference).

BACKGROUND

The present invention relates to the purification of gases, and more particularly to a method of purifying flue gases which contain noxious gases such as $SO_2$.

Dry sorbent injection (DSI) has been used with a variety of sorbents to remove $SO_x$ and other gases from flue gas. However, DSI has typically been done in the past at temperatures much lower than 400° F. because equipment material, such as baghouse media, cannot withstand higher temperatures. Additionally, many sorbent materials sinter or melt at temperatures near or greater than 400° F., which makes them less effective at removing gases. The reactions products of many sorbent materials also adhere to equipment and ducts at higher temperatures, which requires frequent cleaning of the process equipment. To operate at these lower temperatures, the combustion gases must often be cooled before the sorbent was injected. This is an undesirable extra process step.

Thus, there is a need for a sorbent injection method that is effective at removing $SO_x$ gases at elevated temperatures.

SUMMARY

In one aspect, a method of removing $SO_2$ from a flue gas stream including $SO_2$ is provided. The method includes providing a source of trona and injecting the trona into the flue gas stream. The temperature of the flue gas is between about 600° F. and about 900° F. The trona is maintained in contact with the flue gas for a time sufficient to react a portion of the trona with a portion of the $SO_2$ to reduce the concentration of the $SO_2$ in the flue gas stream.

In another aspect, a system for the removal of $SO_2$ from a flue gas stream including $SO_2$ is provided. The system includes a source of trona and a flue gas stream. The system also includes an injector for injecting the trona into the flue gas stream. The temperature of the flue gas is between about 600° F. and about 900° F. The system also includes an area for maintaining the trona in contact with the flue gas for a time sufficient to react a portion of the trona with a portion of the $SO_2$ to reduce the concentration of the $SO_2$ in the flue gas stream.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DETAILED DESCRIPTION

Figure 1:
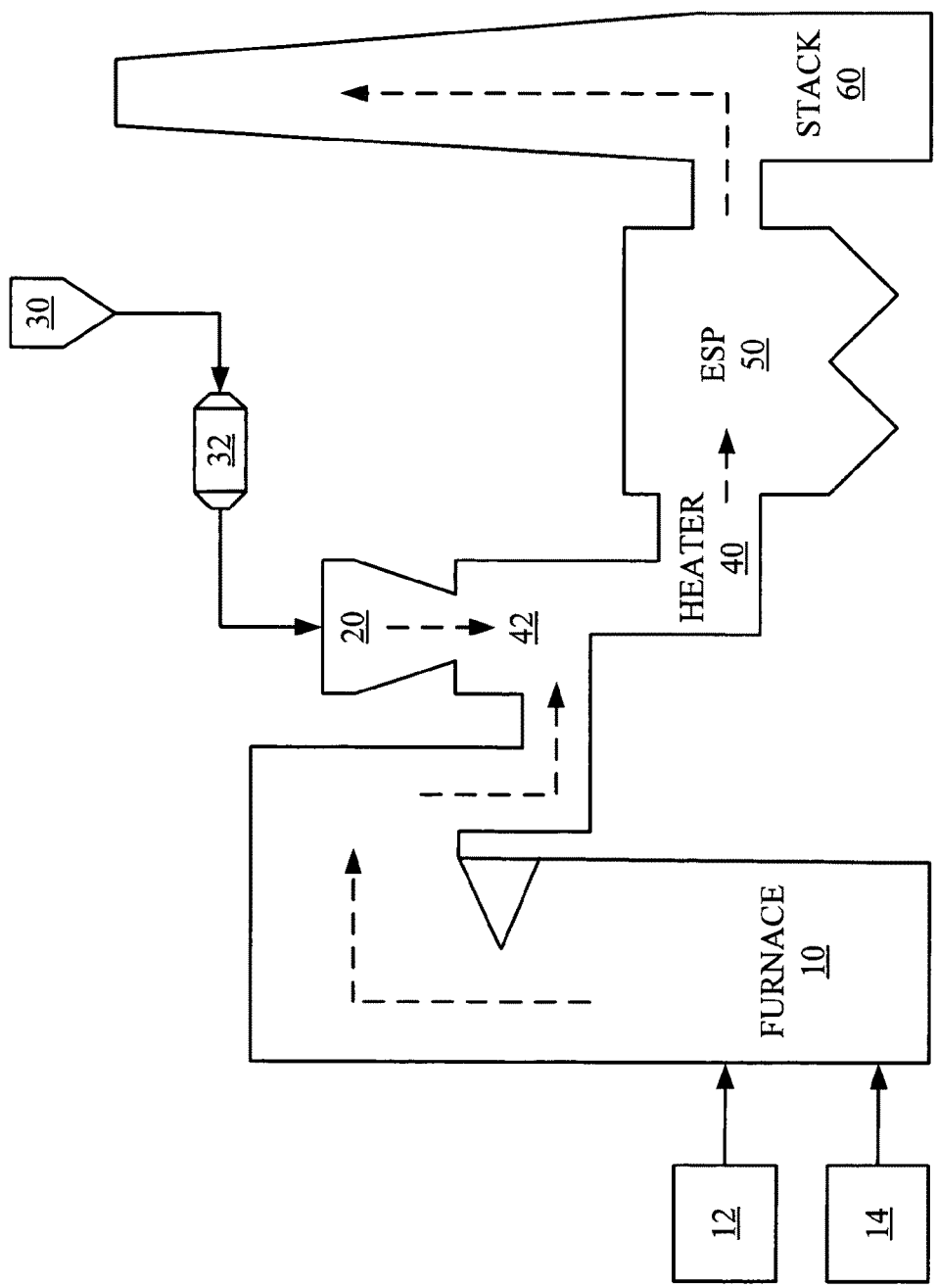
FIG. 1 is a schematic of one embodiment of a flue gas desulfurization system.

The invention is described with reference to the drawings in which like elements are referred to by like numerals. The relationship and functioning of the various elements of this invention are better understood by the following detailed description. However, the embodiments of this invention as described below are by way of example only, and the invention is not limited to the embodiments illustrated in the drawings.

Dry sorbent injection (DSI) has been used as a low cost alternative to a spray dry or wet scrubbing system for the removal of $SO_2$. In the DSI process, the sorbent is stored and injected dry into the flue duct where it reacts with the acid gas. The present invention provides a method of removing $SO_2$ from a flue gas stream comprising $SO_2$, preferably by injecting a sorbent such as trona into a flue gas stream to react with $SO_2$. Trona is a mineral that contains about 85-95% sodium sesquicarbonate ($Na_2CO_3 \cdot NaHCO_3 \cdot 2H_2O$). A vast deposit of mineral trona is found in southwestern Wyoming near Green River. As used herein, the term "trona" includes other sources of sodium sesquicarbonate. The term "flue gas" includes the exhaust gas from any sort of combustion process (including coal, oil, natural gas, glass raw material, etc.). Flue gas typically includes $SO_2$ along with other acid gases such as HCl, $SO_3$, and $NO_x$.

A schematic of the process is shown in FIG. 1. The furnace or combustor 10 is fed with a fuel source 12, such as coal, and with air 14 to burn the fuel source 12. From the combustor 10, the combustion gases are conducted to a heat exchanger or air heater 40. The outlet of the heat exchanger or air heater 40 is connected to a particulate collection device 50. The particulate collection device 50 removes particles made during the combustion process, such as fly ash, from the flue gas before it is conducted to the gas stack 60 for venting. The particulate collection device 50 may be an electrostatic precipitator (ESP). Other types of particulate collection devices, such as a baghouse, may also be used for solids removal. The baghouse contains filters for separating particles made during the combustion process from the flue gas. Because of the relatively small particle size used in the process, the trona may act as a precoat on baghouse filter media.

The $SO_2$ removal system includes a source of trona 30. The trona 30 preferably has a mean particle size between about 10 micron and about 40 micron, most preferably between about 24 micron and about 28 micron. The trona is preferably in a dry granular form. A suitable trona source is T-200® trona, which is a mechanically refined trona ore product available from Solvay Chemicals, Green River, Wyo. T-200® trona contains about 97.5% sodium sesquicarbonate and has a mean particle size of about 24-28 micron. The $SO_2$ removal system may also include a ball mill pulverizer 32, or other type of mill, for decreasing and/or otherwise controlling the trona particle size on site.

The trona is conveyed from the trona source 30 to the injector 20. The trona may be conveyed pneumatically or by any other suitable method. Trona can be easily aerated for pneumatic transfer. Apparatus for injecting the trona or sodium sesquicarbonate is schematically illustrated in FIG. 1. Trona injection apparatus 20 introduces the trona into flue gas duct section 42, which is disposed at a position upstream of the baghouse inlet and upstream of the heat exchanger 40, if a heat exchanger or preheater is present. The trona injection system is preferably designed to maximize contact of the trona with the $SO_x$ in the flue gas stream. Any type of injection apparatus known in the art may be used to introduce the trona into the gas duct. For example, injection can be accomplished directly by a compressed air-driven eductor.

The process requires no slurry equipment or reactor vessel if the trona is stored and injected dry into the flue duct 42 where it reacts with the acid gas. However, the process may also be used with humidification of the flue gas or wet injection of the trona. Additionally, the particulates can be collected wet through an existing wet scrubber vessel should the process be used for trim scrubbing of acid mist.

The temperature of the flue gas varies with the location in the injection system and may also vary somewhat with time during operation. The temperature of the flue gas where the trona is injected is between about 600° F. and about 900° F. The trona is maintained in contact with the flue gas for a time sufficient to react a portion of the trona with a portion of the $SO_2$ to reduce the concentration of the $SO_2$ in the flue gas stream. The temperature of the flue gas is preferably greater than about 630° F., and most preferably greater than about 700° F. The temperature of the flue gas is preferably less than about 800° F., and most preferably less than about 750° F. The temperature of the flue gas is most preferably between about 700° F. and about 750° F.

The process may also be varied to control the flue gas temperature. For example, the flue gas temperature upstream of the trona may be adjusted to obtain the desired flue gas temperature where the trona is injected. Additionally, ambient air may be introduced into the flue gas stream and the flue gas temperature monitored where the trona is injected. Other possible methods of controlling the flue gas temperature include using heat exchanges and/or air coolers. The process may also vary the trona injection location or include multiple locations for trona injection.

For the achievement of desulfurization, trona is preferably injected at a rate with respect to the flow rate of the $SO_2$ to provide a normalized stoichiometric ratio (NSR) of sodium to sulfur of between about 1.0 and 1.5. The NSR is a measure of the amount of reagent injected relative to the amount theoretically required. The NSR expresses the stoichiometric amount of sorbent required to react with all of the acid gas. For example, an NSR of 1.0 would mean that enough material was injected to theoretically yield 100 percent removal of the $SO_2$ in the inlet flue gas; an NSR of 0.5 would theoretically yield 50 percent $SO_2$ removal. $SO_2$ neutralization requires two moles of sodium per one mole of $SO_2$ present.

Unlike sodium bicarbonate, trona does not melt at elevated temperatures. Rather, sodium sesquicarbonate undergoes rapid calcination of contained sodium bicarbonate to sodium carbonate when heated at or above 275° F. It is believed that the "popcorn like" decomposition creates a large and reactive surface by bringing unreacted sodium carbonate to the particle surface for $SO_2$ neutralization. The byproduct of the reaction is sodium sulfate and is collected with fly ash. The chemical reaction of the trona with the $SO_2$ is represented below:

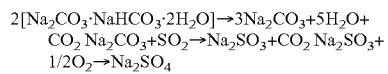

The solid reaction products of the trona and the $SO_2$ (primarily sodium sulfate) and unreacted soda ash may be collected in an electrostatic precipitator, or other particulate collection device. The total desulfurization is preferably at least about 70%, more preferably at least about 80%, and most preferably at least about 90%.

In one embodiment, the flue gas stream further comprises $SO_3$. The trona is maintained in contact with the flue gas for a time sufficient to react a portion of the trona with a portion of the $SO_3$ to reduce the concentration of the $SO_3$ in the flue gas stream. $SO_3$ is typically more reactive with the sorbent than $SO_2$, so the trona would remove the $SO_3$ first. The chemical reaction of the trona with the $SO_3$ is represented below:

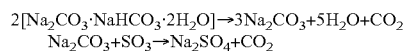

The trona injection system may also be combined with other $SO_x$ removal systems, such as sodium bicarbonate, lime, limestone, etc. in order to enhance performance or remove additional hazardous gases such as HCl, $NO_x$, and the like.

EXAMPLES

A study was done in a commercial glass plant in Verona, Calif. using a hot side electrostatic precipitator (ESP) and no baghouse. Natural gas was used as a fuel source, and the source of sulfur was from the glass raw materials. The $SO_2$ concentration in the flue gas was 800 ppm. The trona used was T-200® from Solvay Chemicals. The trona was injected in the duct using a compressed air blower and air lock feeder. Trona flow rates were measured by calibrating the airlock rpm with the trona weight loss in the trona storage bin. Trona feed rates varied from 50 to 211 pounds/hr.

Example 1

Figure 2:
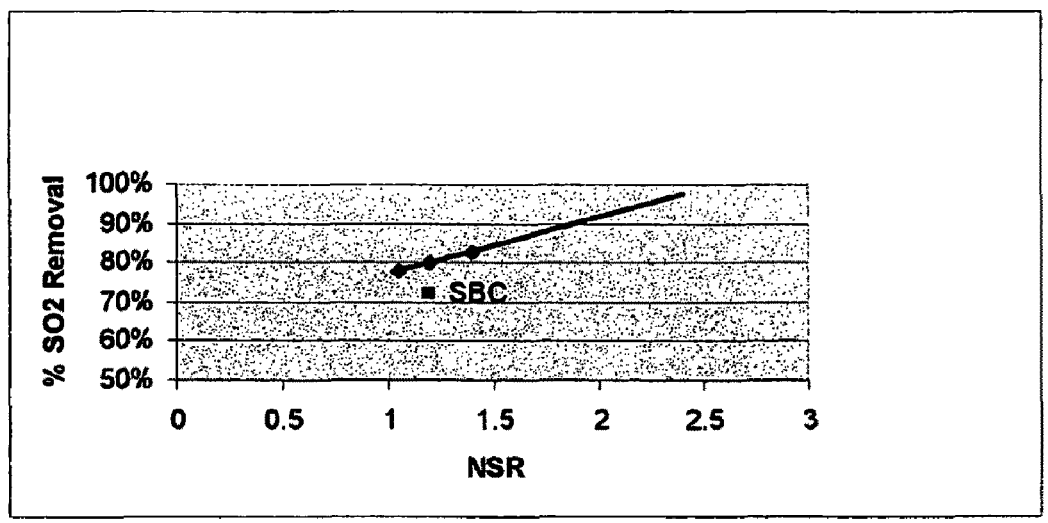
FIG. 2 is a graph showing the % $SO_2$ removal as a function of normalized stochiometric ratio (NSR) for trona and sodium bicarbonate.
Figure 4:
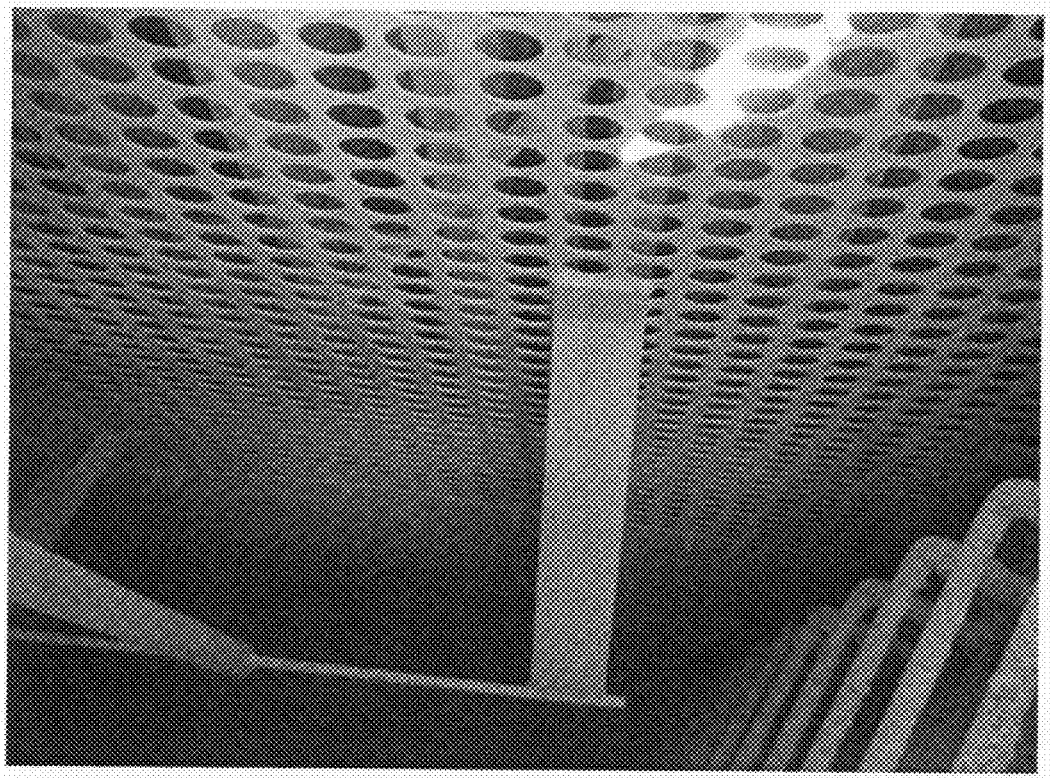
FIG. 4 shows a perforated plate of an electrostatic precipitator after operation in one embodiment of a flue gas desulfurization system using trona.

Trona was injected into flue gas at a temperature of 750° F. at NSR values of 1.0, 1.2, and 1.4. FIG. 2 shows the % $SO_2$ removal as a function of normalized stochiometric ratio (NSR) for trona. From these tests it can be seen that trona yielded $SO_2$ removal rates of around 80% at an NSR of 1.2. FIG. 4 shows a perforated plate of an ESP in the glass plant after operation of the $SO_2$ removal system for five months using trona. It can be seen that the plate is relatively free of solids buildup.

Example 2

Figure 5:
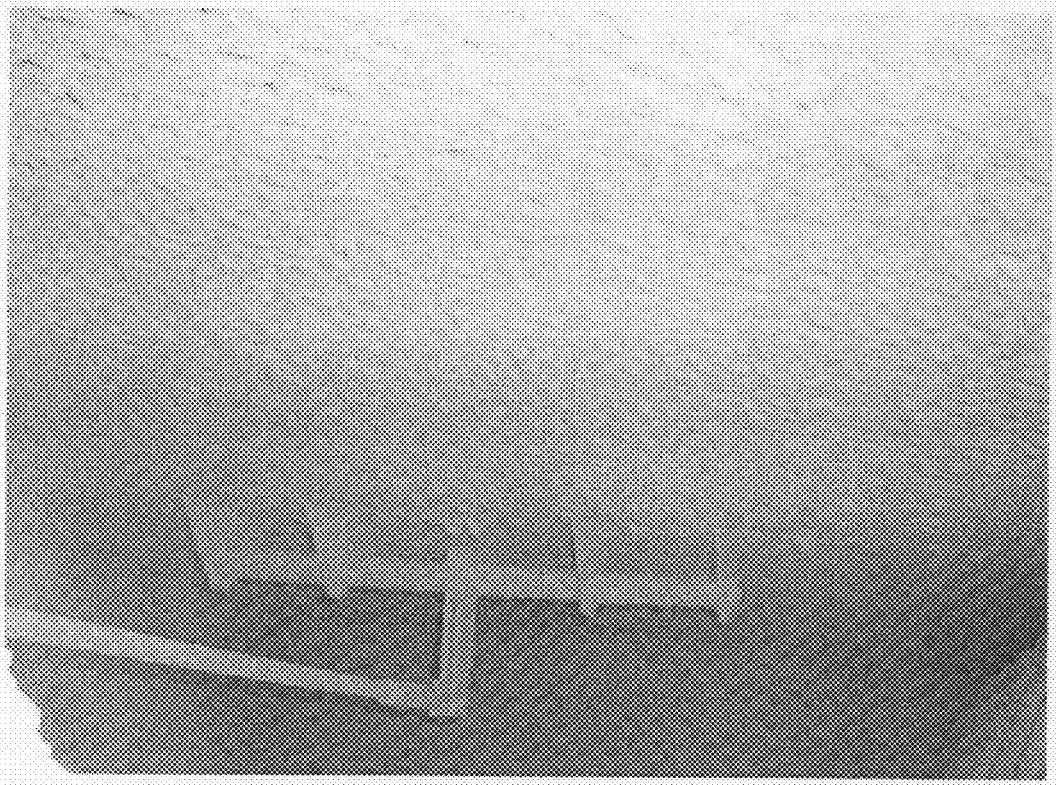
FIG. 5 shows a perforated plate of an electrostatic precipitator after operation in one embodiment of a flue gas desulfurization system using sodium bicarbonate.

As a comparative example, sodium bicarbonate was injected under the same conditions as Example 1 at an NSR of 1.2. The result is shown in FIG. 2. The % $SO_2$ removal of 72% was significantly lower than that of the trona at the same temperature and NSR. FIG. 5 shows a perforated plate of an ESP in the glass plant after operation of the $SO_2$ removal system using sodium bicarbonate. It can be seen that the plate has significant solids buildup.

Example 3

Figure 3:
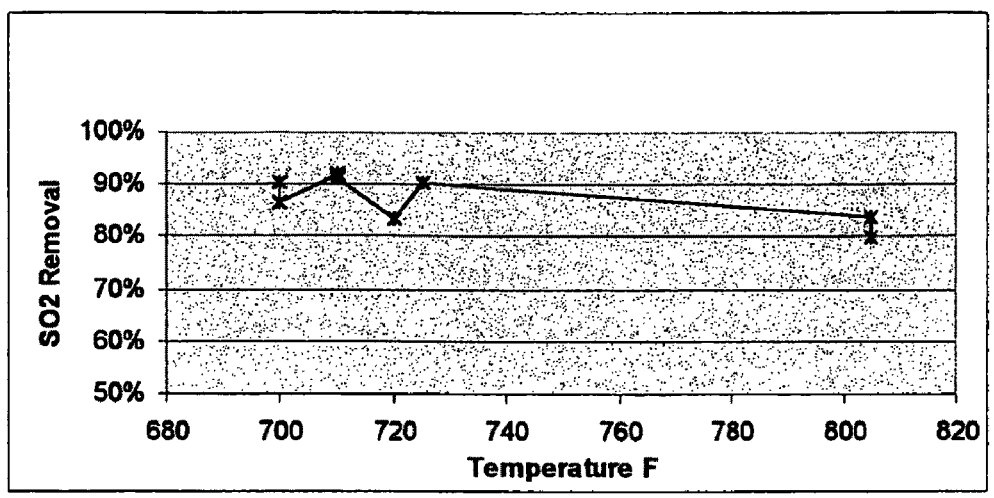
FIG. 3 is a graph showing the % $SO_2$ removal as a function of flue gas temperature for one embodiment of a flue gas desulfurization system.

Trona was injected into flue gas at a NSR of 1.5 in a temperature range of 750° F. to 805° F. FIG. 3 shows the % $SO_2$ removal as a function of flue gas temperature. From these tests it can be seen that trona yielded $SO_2$ removal rates of up to 91% and was effective over a wide range of elevated temperatures.

From the above experiments it can be seen that trona was more effective than sodium bicarbonate at removing $SO_2$ from a flue gas stream at elevated temperatures. Thus, the system can use less sorbent material than a sodium bicarbonate system to achieve the same sulfur reduction. Additionally, it can be seen that trona had good performance over a wide range of elevated temperatures. Finally, the $SO_2$ removal system using trona had much less solids buildup in the perforated plates of the ESP than a system using sodium bicarbonate.

The embodiments described above and shown herein are illustrative and not restrictive. The scope of the invention is indicated by the claims rather than by the foregoing description and attached drawings. The invention may be embodied in other specific forms without departing from the spirit of the invention. Accordingly, these and any other changes which come within the scope of the claims are intended to be embraced therein.

What is claimed is:

1. A method of removing $SO_2$ from a flue gas stream comprising $SO_2$ and $SO_3$, the method comprising:
    providing a source of trona;
    injecting the trona into the flue gas stream, wherein the temperature of the flue gas is between about 600° F. and about 900° F.; and
    maintaining the trona in contact with the flue gas for a time sufficient to react a portion of the trona with a portion of the $SO_2$ and to react a portion of the trona with a portion of the $SO_3$ to reduce the concentration of the $SO_2$ and the $SO_3$ in the flue gas stream.

2. The method of claim 1 wherein the mean particle size of the trona is less than about 40 micron.

3. The method of claim 1 wherein the mean particle size of the trona is between about 10 micron and about 40 micron.

4. The method of claim 1 wherein the mean particle size of the trona is between about 24 micron and about 28 micron.

5. The method of claim 1 wherein the temperature of the flue gas is greater than about 630° F.

6. The method of claim 1 wherein the temperature of the flue gas is greater than about 700° F.

7. The method of claim 1 wherein the temperature of the flue gas is less than about 800° F.

8. The method of claim 1 wherein the temperature of the flue gas is less than about 750° F.

9. The method of claim 1 wherein the temperature of the flue gas is between about 700° F. and about 750° F.

10. The method of claim 1 wherein the trona is injected at a rate with respect to the flow rate of the $SO_2$ to provide a normalized stoichiometric ratio of sodium to sulfur of between about 1.0 and 1.5.

11. The method of claim 1 wherein the trona is injected as a dry material.

12. The method of claim 1 further comprising milling the trona to a desired mean particle size at a location proximate the flue gas stream.

13. The method of claim 1 further comprising collecting a reaction product of the trona and the $SO_2$ in an electrostatic precipitator.

* * * * *